Feb. 13, 1923.

H. H. MERCER.
ROTATING MECHANISM.
FILED APR. 26, 1919.

1,445,152.

Inventor:
Henry H. Mercer,
by
Atty.

Patented Feb. 13, 1923.

1,445,152

UNITED STATES PATENT OFFICE.

HENRY H. MERCER, OF CLAREMONT, NEW HAMPSHIRE, ASSIGNOR TO SULLIVAN MACHINERY COMPANY, A CORPORATION OF MASSACHUSETTS.

ROTATING MECHANISM.

Application filed April 26, 1919. Serial No. 292,999.

*To all whom it may concern:*

Be it known that I, HENRY H. MERCER, a citizen of the United States, residing at Claremont, in the county of Sullivan and State of New Hampshire, have invented certain new and useful Improvements in Rotating Mechanisms, of which the following is a full, clear, and exact specification.

This invention relates to rotating mechanisms and especially to mechanisms for rotating winding drums, although, as is obvious, the invention is applicable to other rotating mechanisms such as belt wheels.

One object of the present invention is to provide an improved rotating means. Another object of the present invention is to provide an improved means for transferring the rotating motion of a driving element to an element to be driven, and to provide an improved means for controlling connections therebetween so as to control the motion of the driven member in an improved manner. Still another object of the present invention is to provide a rotating mechanism whose parts are simply and easily constructed and which is exceedingly compact. These and other objects and advantages of my invention will, however, hereinafter more fully appear.

In the accompanying drawings, I have shown for purposes of illustration one embodiment which my invention may assume in practice, applied to a reel in which a winding drum may be rotated at will to reel in or pay out a cable or other element carried by the drum.

In these drawings,—

Figure 1:
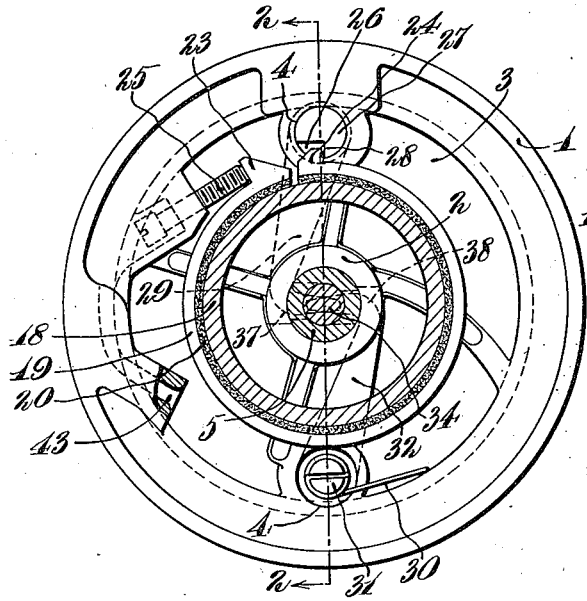
Fig. 1 is a sectional view of my improved rotating mechanism, taken substantially on the line 1—1 Fig. 2.
Figure 2:
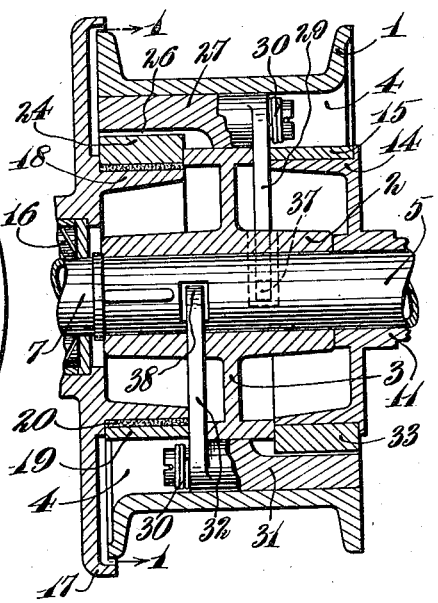
Fig. 2 is a transverse sectional view substantially on the line 2—2 Fig. 1 with parts shown in elevation.

In the illustrative construction, I have shown a winding drum 1 having a hub 2 on which the drum is mounted and a supporting web 3 therebetween, the drum being preferably provided with a plurality of longitudinally disposed shaft bearings 4, the latter being preferably diametrically disposed on opposite sides of the hub 2.

The hub 2 is preferably mounted upon and keyed or otherwise held against rotation on a hollow axle or carrier 5 having a thrust bearing 6 at one end thereof and an axle bearing 7 at the other end thereof, the latter bearing preferably having an axial opening communicating with the hollow interior of the hollow axle or carrier 5. In the form shown, the bearing 6 is mounted in a housing 8 of a driving element 9 herein shown as a worm gear fastened as by a key 10 to a rotating sleeve or hub 11 preferably rotatably mounted upon the axle or carrier 5. The thrust bearing 6 may be assembled through an opening in one side of the housing 8 and held in place by a nut 12 threaded onto the end of the axle 5, the opening being closed by a plug 13. The inner end of the driving hub 11 carries a clutch element 14 shown herein as a friction cylinder which coacts with a friction band 15 preferably carried by the drum 1, the friction band being operable by mechanism to be hereinafter described to grip the clutch element 14 and thereby connect the drum with the driving gear 9.

The roller bearing 16 in which the axle bearing 7 revolves is shown as mounted in an end casing 17, the latter preferably having a braking element 18 shown herein as a friction cylinder adapted to cooperate with a clutch element 19 preferably carried by the drum, or a friction lining 20 which may be interposed between the clutch element 19 and the friction clutch or braking element 18. Mounted also on the housing or frame 17 is a bracket 21 and a housing 22 which support and house a part of the controlling means for controlling the plurality of clutches carried by the drum.

While the flexible clutch elements 15 and 19 may be controlled in a variety of ways, I preferably provide an improved controlling means for these elements which may be mounted wholly within the drum, the plurality of controlling mechanisms shown being identical. Inasmuch as the illustration and description of only one of these controlling means is necessary, I have illustrated in detail the controlling means for the flexible clutch element 19, it being understood that the construction for the other controlling element is substantially identical to this one. The clutch ring 19 is shown as a split ring having bosses 23 and 24 formed on its opposite ends, the boss 23 abutting against an adjusting screw 25 carried by the drum and by means of which the action of the element 19 may be adjusted, the boss 24 projecting into a notch 26 formed in a dog shaft 27 so as to be engaged by a shoulder 28 formed on this shaft, as the latter is rotated in one direction by a dog arm 29. The dog shaft is preferably normally held in an inoperative position by a spring 30 which engages the shaft and the drum. From the foregoing, it will be obvious that normally the split ring 19 is expanded so it does not force the friction lining 20 into engagement with the cooperating clutch or braking element 18, and that upon a rotation of the dog arm 29 in one direction, the shoulder 28 will engage the boss 24 and contract the split ring and thereby brake the drum to retard the motion thereof or hold the drum against any rotative movement. The corresponding parts for controlling the clutch element 15 are the dog shaft 31, the dog arm 32, these elements being operative against a boss 33 formed on one end of the split ring clutch element 15 to contract the latter and thereby form an operative connection between the drum and the driving gear 9.

Figure 3:
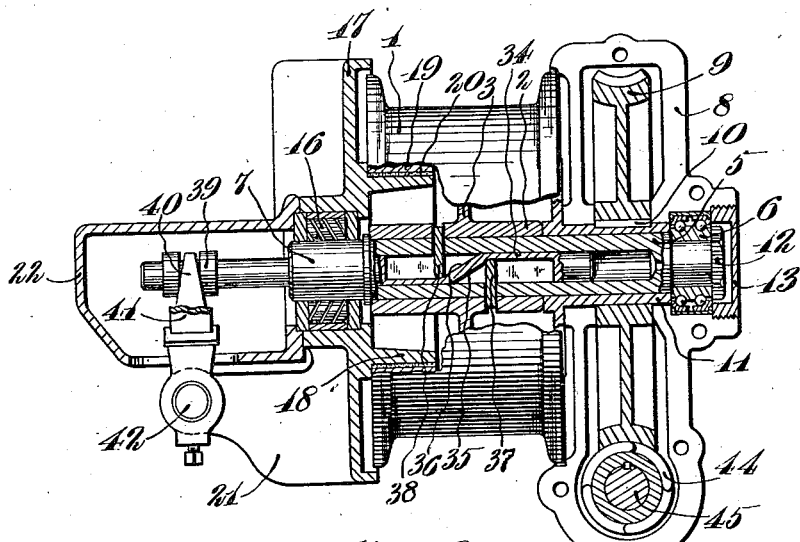
Fig. 3 is a side elevation of my improved rotating mechanism, parts thereof being removed and parts being broken away to facilitate illustration.

Controlling means may be provided for simultaneously controlling the dog arms 29 and 32, but I preferably provide means for alternately controlling these elements so that the two clutches will not be operated at the same time, and so form connections between the drum and the braking element 18, and the drum and the rotating element 14, and for this purpose, I preferably use a reciprocating rod 34 reciprocably mounted in the hollow axle or carrier 5 and extending through the hollow bearing 7 to a point preferably within the housing 22. Within the carrier 5 this reciprocating rod or clutch controlling member is preferably provided with a plurality of inclined surfaces 35, 36 adapted to alternately engage the ends 37, 38 of the dog arms 29, 32 which ends project into the interior of the carrier 5 through suitable openings provided in the hub 2 and the carrier or axle 5. The controlling rod 34 is herein shown as controlled by a shipper ring 39, a shipper yoke 40 cooperating therewith, and a manually controllable handle 41 connected to the shipper yoke controlling handle, the yoke being mounted on shipper shaft 42 carried by the bracket 21. It will be obvious from the foregoing that when the handle 41 is swung to the left (see Fig. 3) the inclined surface 36 will coact with the inwardly projecting end 38 of the dog arm 32 and thereby engage the split clutch ring 15 with the corresponding driving clutch face 14 and cause the drum to be rotated. If the controlling arm 41 be thrown in the opposite direction, the dog arm end 38 will be released and it will assume an inoperative position under the influence of the spring carried by the dog shaft, while the inwardly projecting end 37 of the dog arm 29 will be thrown outwardly, forcing the split ring clutch element 19 or the friction band 20 into engagement with the corresponding braking clutch element 18, and thereby apply a braking connection between the drum 1 and a fixed member. When the parts are in the position illustrated in Fig. 3, both of the dog arms 29 and 32 are in their normal inoperative positions, and the drum is free to rotate so that a cable which is on the drum may be paid out by merely pulling on the cable. In the form of the mechanism shown herein, one end of this cable may be attached to the drum as by a hollow boss 43, through which one end of the cable may be passed and fastened within the drum as by means of a knot formed on that end of the cable.

The driving worm gear 9 may, if desired, be rotated in either direction so as to pay out or take in the cable, or if a belt wheel be substituted for the drum 1, to rotate the belt wheel in either direction. However, in the operation of the winding drums, it is often only essential that the drum be rotated mechanically in one direction, and for this purpose, I provide in the embodiment of my invention shown herein, a worm 44 cooperating with the worm gear 9 to drive the latter, the worm being mounted on an axle 45 which is preferably constantly driven in one direction as by motor, not shown.

It should be noted that by the improved construction herein shown and described that I have provided a very compact rotating mechanism for rotating a driven element such as a winding drum or belt pulley, and of such construction that the clutch mechanisms and the clutch controlling mechanisms therefor are mounted wholly within the drum, and further, that through the type of clutch controlling mechanisms shown herein a very powerful and easily operable clutch control is provided. It should further be noted that in this improved construction, it is impossible to brake the driven element and to connect this element with the driving element at the same time and thereby cause injury or undue wear to the clutching mechanisms, and that the operation of the plurality of clutches is easily effected by manipulation of a single controlling arm. It should further be noted, though the driving element is constantly being driven in one direction, that a variable feed of the rope on the drum may be effected by slipping the driving clutch elements through manipulation of the controlling arm 41, and further, if this drum is used for hoisting or other similar purposes, that a rope may be paid out as is desired by the slipping of the braking clutch elements through manipulation of the same clutch controlling handle.

While I have in this application specifically described one embodiment which my invention may assume in practice, it is to be understood that this form is used for illustrative purposes only and that the invention may be modified and embodied in various other forms without departing from its spirit or the scope of the appended claims.

What I claim as new and desire to secure by Letters Patent is:

1. In a reel, a hollow axle, a drum mounted coaxially therewith, a fixed element projecting into said drum, means carried by said drum and movable to engage with said fixed element to brake the drum, and means carried in said hollow axle for controlling said braking means.

2. In a reel, a hollow axle, a drum secured coaxially thereto, a fixed member, a rotating member, means for connecting said drum and said members, and means carried in said hollow axle for controlling said connecting means.

3. In a reel, a hollow axle, a drum mounted coaxially therewith, a fixed member, a rotating member loosely mounted on said axle, means for connecting said drum and said members, and means carried in said hollow axle for controlling said connecting means.

4. In a reel, a hollow axle, a drum mounted coaxially therewith, a fixed member, a rotating member loosely mounted on said axle and constantly driven in one direction, means for connecting said drum and said members, and means carried in said hollow axle for controlling said connecting means.

5. In a reel, a hollow axle, a drum mounted coaxially therewith and secured thereto, a fixed member, a rotating member, a plurality of means for connecting said drum and said members, and means carried in said hollow axle and alternately engageable with said connecting means for controlling the latter.

6. In a reel, a hollow axle, a drum mounted coaxially therewith, a driving member mounted on said axle and rotatable independently thereof, a fixed member, clutch mechanism for connecting said drum and said rotating member, clutch mechanism for connecting said drum and fixed member, and a plurality of clutch controlling members projecting into said hollow axle.

7. In a reel, a hollow axle, a drum mounted coaxially therewith, a driving member mounted on said axle and rotatable independently thereof, a fixed member, clutch mechanism for connecting said drum and said rotating member, clutch mechanism for connecting said drum and said fixed member, a plurality of clutch controlling members projecting into said hollow axle, and a reciprocating member alternately engageable with said last named members to control the clutch mechanisms.

8. In a reel, a hollow axle, a bearing therefor, a drum mounted coaxially therewith, a driving member mounted on said axle and rotatable independently thereof, a fixed member, clutch mechanism for connecting said drum and said rotating member, clutch mechanism for connecting said drum and fixed member, a plurality of clutch controlling members projecting into said hollow axle, and a reciprocating member projecting through said bearing into said hollow axle and alternately engageable with said last named members to control the clutch mechanisms.

9. In a reel, a hollow axle, a drum mounted thereon and rotatable therewith, a rotating member projecting into said drum at one end thereof, a stationary member projecting into said drum at the other end thereof, means carried by said drum to engage said stationary and rotating members, and means in said hollow axle for causing said means to alternately engage said members.

10. In a reel, a hollow axle, a drum mounted thereon and rotatable therewith, a rotating member projecting into said drum at one end thereof, a stationary member projecting into said drum at the other end thereof, friction bands carried by said drum and adapted to engage said stationary and said rotating members, means carried by said drum for causing said bands to contract to grip said members, and operating means in said hollow axle for said last mentioned means.

11. In a reel, a hollow axle, a drum mounted thereon and rotatable therewith, a rotating member projecting into said drum at one end thereof, a stationary member projecting into said drum at the other end thereof, friction bands carried by said drum and adapted to engage said stationary and said rotating members, means carried by said drum for causing said bands to contract to grip said members, and operating means in said hollow axle for said last mentioned means, said operating means being so constructed that in an intermediate position neither of said bands grips said members.

12. In a mechanism of the class described, a rotatably mounted drum, a power rotated driving element coaxial therewith, a stationary element coaxial therewith, a pair of friction band members, a pair of members having annular surfaces to cooperate with said band members, one of said pairs of members being secured to said drum for rotation therewith and the other of said pairs of members being secured to said elements, and means to cause alternate but not simul- 13. In a mechanism of the class described, a rotatably mounted drum, a power rotated driving element coaxial therewith, a stationary element coaxial therewith, a pair of friction band members, a pair of members having annular surfaces to cooperate with said band members, one of said pairs of members being secured to said drum for rotation therewith and the other of said pairs of members being secured one to each of said elements, and means to cause alternate but not simultaneous cooperation of certain of said elements and members to effect braking or driving of said drum including cam operating means reciprocable longitudinally of said drum.

14. In a mechanism of the class described, a rotatably mounted drum, a power rotated driving element coaxial therewith, a stationary element coaxial therewith, a pair of friction band members, a pair of members having annular surfaces to cooperate with said band members, one of said pairs of members being secured to said drum for rotation therewith and the other of said pairs of members being secured one to each of said elements, and means to cause alternate but not simultaneous cooperation of certain of said elements and members to effect braking or driving of said drum including cam operating means reciprocable longitudinally of said drum and operative upon movements in opposite directions respectively to effect braking and driving of said drum.

In testimony whereof I affix my signature.

HENRY H. MERCER.